United States Patent
Saito et al.

(10) Patent No.: US 7,680,365 B2
(45) Date of Patent: Mar. 16, 2010

(54) OPTICAL FIBER SHEET AND ITS MANUFACTURING METHOD

(75) Inventors: Kazuhito Saito, Kanagawa (JP); Masaki Ohmura, Kanagawa (JP); Masao Kinoshita, Tokyo (JP); Hiroshi Masuda, Ibaraki (JP); Shuji Suzuki, Tokyo (JP); Osamu Ibaragi, Tokyo (JP)

(73) Assignees: Sumitomo Electric Industries, Ltd., Osaka (JP); NEC Corporation, Tokyo (JP); Hitachi Chemical Company, Ltd., Tokyo (JP); Hirose Electric Company, Ltd., Tokyo (JP)

( * ) Notice: Subject to any disclaimer, the term of this patent is extended or adjusted under 35 U.S.C. 154(b) by 0 days.

(21) Appl. No.: 11/435,293

(22) Filed: May 17, 2006

(65) Prior Publication Data

US 2007/0003185 A1 Jan. 4, 2007

(30) Foreign Application Priority Data

May 17, 2005 (JP) .......................... P.2005-144711

(51) Int. Cl.
*G02B 6/00* (2006.01)
(52) U.S. Cl. ........................................ 385/14; 385/137
(58) Field of Classification Search ......... 385/129–132, 385/39, 14, 146
See application file for complete search history.

(56) References Cited

U.S. PATENT DOCUMENTS 5,420,952 A * 5/1995 Katsura et al. ................. 385/80
6,668,129 B2 * 12/2003 Kondo et al. ................. 385/137
7,547,148 B2 * 6/2009 Ikunishi ........................ 385/78

FOREIGN PATENT DOCUMENTS

| JP | 07-176716 | 7/1995 |
| JP | 10-332997 | 12/1998 |
| JP | 2000-066035 A | 3/2000 |
| JP | 2000-329962 | 11/2000 |
| JP | 2001-330738 | 11/2001 |
| JP | 2002-90554 | 3/2002 |
| JP | 2002090554 A * | 3/2002 |
| JP | 2002-365450 | 12/2002 |
| JP | 2003-114340 | 4/2003 |
| JP | 2003-322728 | 11/2003 |
| JP | 2004-094286 | 3/2004 |
| WO | WO 03/083546 A1 | 10/2003 |

OTHER PUBLICATIONS

Japanese Office Action issued in Japanese Patent Application No. JP 2005-144711 dated Mar. 31. 2009.
Japanese Office Action, with partial English Translation, issued in Japanese Patent Application No. JP 2005-144711, dated Jul. 7, 2009.
Japanese Notification of Reason for Refusal, w/ English translation thereof, issued in Japanese Patent Application No. JP 2005-144711 dated Sep. 29, 2009.

* cited by examiner

*Primary Examiner*—Sarah Song
(74) *Attorney, Agent, or Firm*—McDermott Will & Emery LLP

(57) ABSTRACT

An optical fiber sheet comprises optical fibers sandwiched between sheet members and fixed thereto. Distal ends of the optical fibers extend from outer peripheral edges of the sheet members with resin coatings applied to the distal ends to produce extensions. The distal ends of the extensions are inserted into fiber holes of connectors with the resin coatings applied to the distal ends to be connected with the connectors.

5 Claims, 3 Drawing Sheets

OPTICAL FIBER SHEET AND ITS MANUFACTURING METHOD

TECHNICAL FIELD

The present disclosure relates to an optical fiber sheet and its manufacturing method. More particularly, the present disclosure relates to an optical fiber sheet having optical fibers sandwiched between sheet members and fixed thereto, the distal ends of which fibers extend from the outer edges of the sheet members with resin coatings applied to the distal ends, and relates to a method of manufacturing the optical fiber sheet.

RELATED ART

An optical fiber sheet has optical fibers sandwiched between flexible sheet members and fixed thereto, and connectors are attached to the distal ends of extensions of the optical fibers extending from the optical fiber sheet (for example, see Japanese Patent Unexamined Publication No. 2002-90554, Japanese Patent Unexamined Publication No. 2002-365450, and Japanese Patent Unexamined Publication No. 2003-114340).

Each of the optical fibers has a glass portion containing a core and a cladding, and a coating made of resin covering the outer circumferential surface of the glass portion. When attaching the connectors to the distal ends of the optical fibers, the resin coatings on the distal ends of the optical fibers are generally removed so that the glass portions can be exposed. Then, the glass portions exposed at the distal ends of the optical fibers are inserted into optical connector ferrules and fixed thereto by bonding, and finally the ferrule end faces are ground.

In this method, however, the length of the optical fibers may be reduced by connection operation errors such as breakage of the fragile glass portions during the resin coating removal step of the optical fibers or the insertion step of the glass portions exposed at the distal ends of the optical fibers into the ferrules. In this case, the attachment positions into the ferrules are shifted from the predetermined positions, and in the worst case the optical fibers having the reduced length cannot be attached to the ferrules. For overcoming this problem, surplus portions have been given to the optical fibers in advance, but dealing with the surplus portions is troublesome when they are excessively long. When the surplus portions are too short, the decreased length of the optical fibers cannot be sufficiently compensated.

In view of design, the allowable bend radius of the typical optical fibers wired on the optical fiber sheet is required to be at least 30 mm so that the reliability of the optical fibers can be secured. Therefore, with the resultant wiring pattern, it is difficult to reduce the size of the sheet and wire the optical fibers with a high degree of density.

SUMMARY

The disclosure below describes an optical fiber sheet capable of eliminating the necessity of excessively long surplus portions of optical fibers by increasing easiness of connection of connectors, and thus capable of achieving miniaturization and high-density wiring of the optical fiber sheet. The disclosure also describes a method of manufacturing this optical fiber sheet.

An example implementation of the invention is described below. An optical fiber sheet includes: optical fibers sandwiched between sheet members and fixed thereto, distal ends of the optical fibers extending from outer peripheral edges of the sheet members with resin coatings applied to the distal ends to produce extensions. The optical fiber sheet is characterized in that the distal ends of the extensions are inserted into fiber holes of connectors with the resin coatings applied to the distal ends and connected with the connectors.

According to the optical fiber sheet having this structure, the distal ends of the extensions extending from the outer peripheral edges of the sheet members between which the optical fibers are sandwiched and fixed are inserted into the fiber holes of the connectors to be connected with the connectors with the resin coatings applied to the distal ends without requiring the process for removing the resin coatings from the optical fibers. Accordingly, connection operation errors can be reduced and thus the necessity of providing excessively long surplus portions can be eliminated.

In the optical fiber sheet described above according to the invention which contains the optical fibers whose distal ends extending from the optical fiber sheet are connected with the connectors with the resin coatings applied to the distal ends, the optical fibers may be multimode optical fibers.

According to the optical fiber sheet having this structure, the multimode optical fibers are used. Thus, even when the optical fibers are connected with the connectors with the resin coating applied to the distal ends of the optical fibers causing unstable accuracy of the resin coating outside diameter which may shift the optical axis to some extent, this deviation can be allowed.

In the optical fiber sheet according to the invention described above which contains the multimode optical fibers whose distal ends extending from the optical fiber sheet are connected with the connectors with the resin coatings applied to the distal ends, the minimum coating thickness of the multimode optical fibers may be 22.5 μm.

According to the optical fiber sheet having this structure, since the multimode optical fibers having a small diameter with the minimum coating thickness of the multimode optical fibers of 22.5 μm are used, the allowable bend radius of the optical fibers wired between the sheet members can be decreased and thus the optical fiber sheet can be miniaturized.

In the optical fiber sheet according to the invention described above which contains the multimode optical fibers whose distal ends extending from the optical fiber sheet are connected with the connectors with the resin coatings applied to the distal ends, the allowable minimum bend radius of the optical fibers wired between the sheet members may be 5 mm.

According to the optical fiber sheet having this structure, since the allowable minimum bend radius of the optical fibers wired between the sheet members is 5 mm, the optical fiber sheet can be miniaturized and thus is applicable to narrow-space connections between devices in the curved condition of the optical fiber sheet.

In the optical fiber sheet according to the invention described above which contains the multimode optical fibers whose distal ends extending from the optical fiber sheet are connected with the connectors with the resin coatings applied to the distal ends, the extensions may be bended in the direction perpendicular to the plane of the sheet members and the connectors may be attached to the distal ends of the bended extensions so that the optical fiber sheet can be attached onto a board in a state that the connectors project from a surface of the board.

According to the optical fiber sheet having this structure, since the connectors provided to the optical fibers extending from the optical fiber sheet attached to the board project in the direction perpendicular to the board surface, optical boards and the like can be easily connected to the connectors in the direction perpendicular to the board surface.

Further, a method of manufacturing an optical fiber sheet includes the steps of: wiring optical fibers coated with resin coating on a first sheet member, and forming extensions by extending distal ends of the optical fibers by a predetermined length from an outer peripheral edge of the first sheet member; overlapping a second sheet member on the first sheet member to combine these sheet members into one piece; and inserting the distal ends of the extensions into fiber holes of connectors with resin coatings applied to the distal ends.

According to the method of manufacturing an optical fiber sheet including these steps, the optical fibers are wired on the first sheet member and the distal ends of the optical fibers are extended from the outer peripheral edge of the fist sheet member to form the extensions. Then, the second sheet member is overlapped on the first sheet member and the optical fibers are sandwiched between these sheet members to be fixed thereto. Subsequently, the distal ends of the extensions are inserted into the fiber holes of the connectors with the resin coatings applied to the distal ends without requiring the process for removing the resin coatings from the optical fibers. Accordingly, connection operation errors can be reduced and thus the necessity of providing excessively long surplus portions can be eliminated.

Various implementations may include one or more the following advantages. For example, the optical fibers are inserted into the fiber holes of the connectors and connected with the connectors with the resin coatings applied to the optical fibers without requiring the process for removing the resin coatings from the optical fibers. It is therefore unnecessary to provide excessively long surplus portions which require troublesome handling as in the case of the related-art optical fiber sheet. Accordingly, connection operation errors can be reduced and thus the necessity of providing excessively long surplus portions can be eliminated.

Other features and advantages may be apparent from the following detailed description, the accompanying drawings and the claims.

DETAILED DESCRIPTION

Preferred embodiments according to the invention are hereinafter described in detail with reference to the appended drawings.

Figure 1:
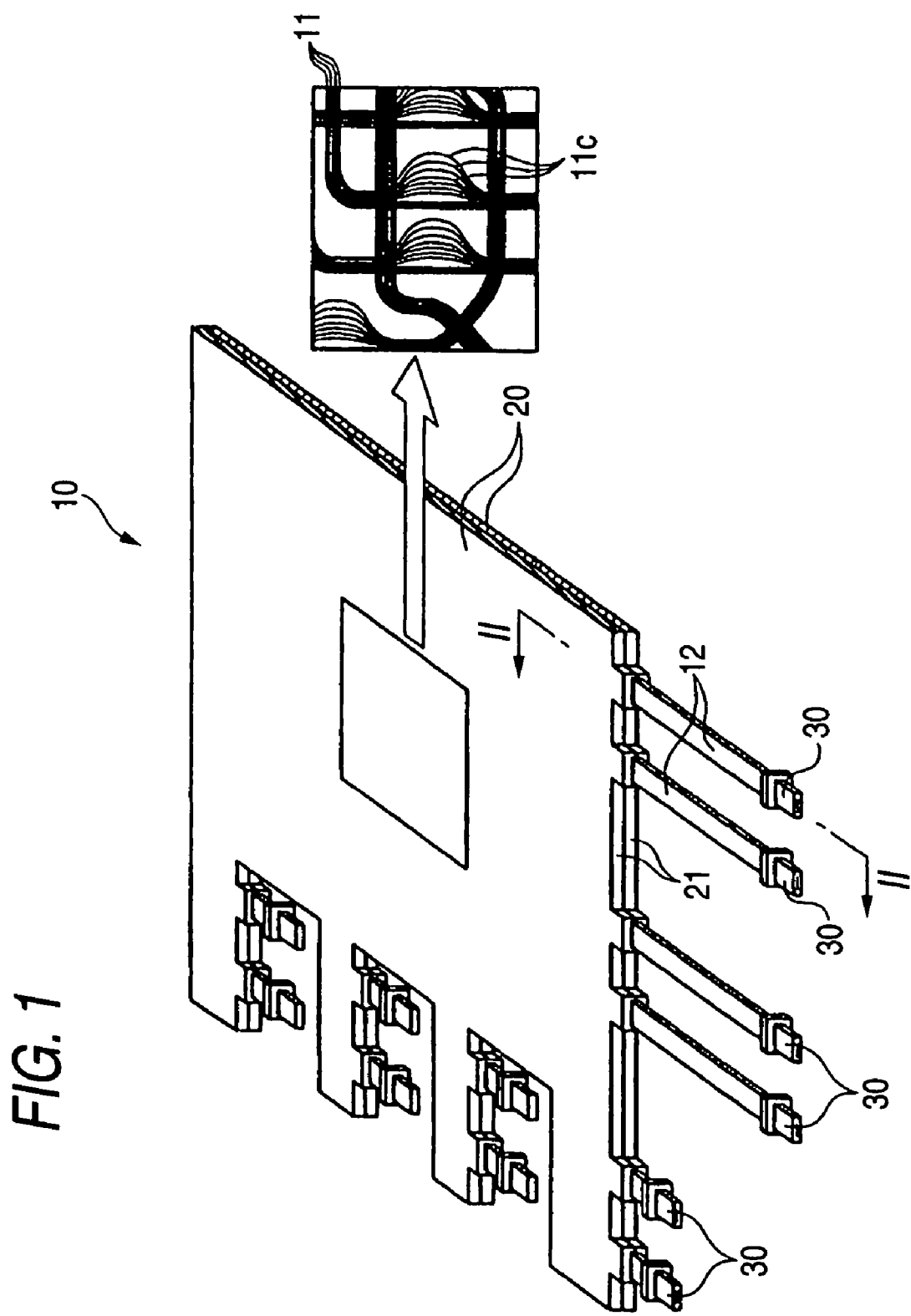
FIG. 1 is a perspective view showing an optical fiber sheet in a first embodiment according to the invention, with enlarged illustration of the inner structure of the optical fiber sheet.
Figure 2:
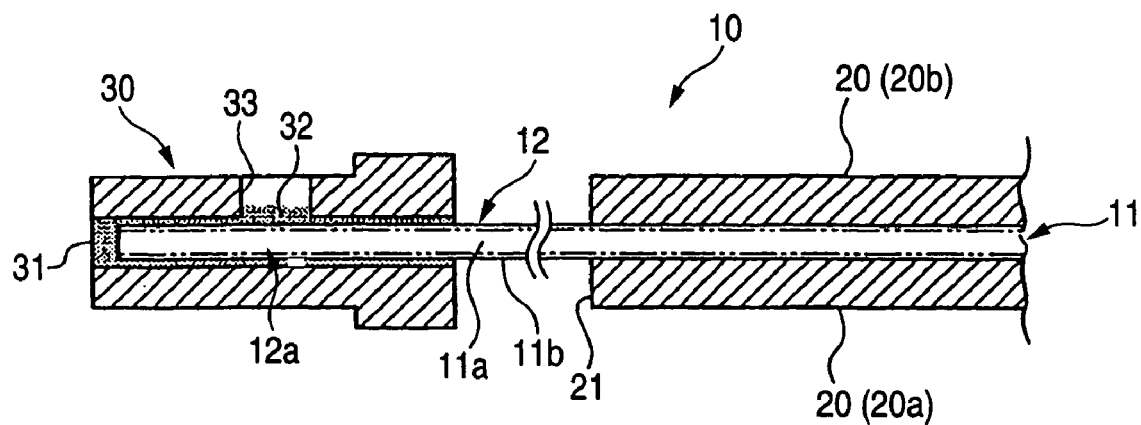
FIG. 2 is a cross-sectional view of the optical fiber sheet taken along a line II-II in FIG. 1.

FIG. 1 is a perspective view showing an optical fiber sheet in a first embodiment according to the invention, with enlarged illustration of the inner structure of the optical fiber sheet. FIG. 2 is a cross-sectional view of the optical fiber sheet taken along a line II-II in FIG. 1.

As illustrated in FIG. 1, in an optical fiber sheet 10 of the first embodiment according to the invention, optical fibers 11 are sandwiched between flexible sheet members 20, 20 and fixed thereto, and extensions 12 as the distal ends of the optical fibers 11 extend from outer peripheral edges 21 of the sheet members 20 with resin coatings applied to the extensions 12. The distal ends 12a of the extensions 12 are inserted into fiber holes 31 of connectors 30 with resin coatings 11b applied to the distal ends 12a (see FIG. 2) (without removing the resin coatings from the optical fibers 11).

The optical fibers 11 provided on the optical fiber sheet 10 are preferably formed by multimode optical fibers. The minimum coating thickness is preferably 22.5 µm. The allowable minimum bend radius is preferably 5 mm.

Thus, as illustrated in FIG. 1, the optical fibers 11 are wired in an arbitrary pattern while bended with a bend radius which is the minimum bend radius or larger. For preparing the worst case, the optical fibers 11 provided with surplus portions 11c are sandwiched between the sheet members 20, 20 and fixed thereto.

As illustrated in FIG. 2, each of the optical fibers 11 has a glass portion 11a containing a core and a cladding, and the coating 11b made of resin covering the outer circumferential surface of the glass portion 11a. The distal end 12a of the extension 12 is inserted into the fiber hole 31 of the connector 30 with the resin coating 11b applied to the distal end 12a and fixed to the fiber hole 31 by adhesive 32. Since the process for removing the resin coatings 11b is not required, operation errors in coating removal can be reduced. Moreover, since the glass portions 11a are inserted into the fiber holes 31 not directly but with protection of the resin coatings 11b, connection operation errors such as scratches on and breakage of the glass portions 11a can be reduced. Accordingly, the necessity of providing excessively long surplus portions for preparing for connection operation errors can be eliminated.

The adhesive 32 may be injected into the fiber holes 31 in advance, and then the distal ends 12a of the extensions 12 may be inserted into the fiber holes 31 and fixed thereto. Alternatively, the distal ends 12a of the extensions 12 may be inserted into the fiber holes 31, and then the adhesive 32 may be injected through holes 33 formed on the connectors 30 so as to fix the optical fibers 11.

The optical fibers 11 provided on the optical fiber sheet 10 are formed by multimode optical fibers. Accordingly, shift of the optical axis to some extent caused by thickness errors of the resin coatings 11b is allowed and thus workability is enhanced. The minimum thickness of the resin coatings 11b is 22.5 µm, and the overall outside diameter is 125 µm, for example. Thus, the allowable bend radius of the optical fibers 11 can be reduced to a minimum of 5 mm, which is smaller than the allowable bend radius of 30 mm for the outside diameter of 250 µm of the related-art typical optical fibers. As a result, the degree of freedom of wiring can be increased and thus high-density wiring and miniaturization of the optical fiber sheet 10 can be achieved.

The optical fiber sheet 10 having this structure is applicable to narrow-space connections between optical devices. In this case, the optical fiber sheet 10 can be curved or folded into arbitrary shapes for use.

Next, a method of manufacturing the optical fiber sheet according to the invention is discussed.

Initially, the optical fibers 11 coated with resin coatings are wired on a first sheet member 20a (see FIG. 2). The optical fibers 11 are formed by multimode optical fibers provided with the resin coatings 11b having the minimum thickness of 22.5 µm and the allowable minimum bend radius of 5 mm. Thus, the degree of freedom of wiring can be increased and thus high-density wiring and miniaturization of the optical fiber sheet 10 can be achieved.

Then, the distal ends of the optical fibers 11 are extended by a predetermined length from the outer peripheral edge 21 of the first sheet member 20a to form the extensions 12, and a second sheet member 20b (see FIG. 2) is overlapped on the first sheet member 20a so that both the sheet members 20a and 20b can be combined into one piece and that the optical fibers can be fixed therebetween. Thereafter, the distal ends 12a of the extensions 12 are inserted into the fiber holes 31 of the connectors 30 with the resin coatings 11b applied to the distal ends 12a and fixed by the adhesive 32, and finally the end faces of the connectors 30 are ground.

According to the optical fiber sheet and its manufacturing method in the first embodiment explained above, the distal ends 12a of the extensions 12 extending from the outer peripheral edges 21 of the sheet members 20 between which the optical fibers 11 are sandwiched and fixed are inserted into the fiber holes 31 of the connectors 30 to be connected with the connectors 30 with the resin coatings 11b applied to the distal ends 12a without requiring the process for removing the resin coatings 11b from the optical fibers 11. Accordingly, connection operation errors can be reduced and thus the necessity of providing excessively long surplus portions can be eliminated.

Next, an optical fiber sheet in a second embodiment according to the invention is described.

Figure 3:
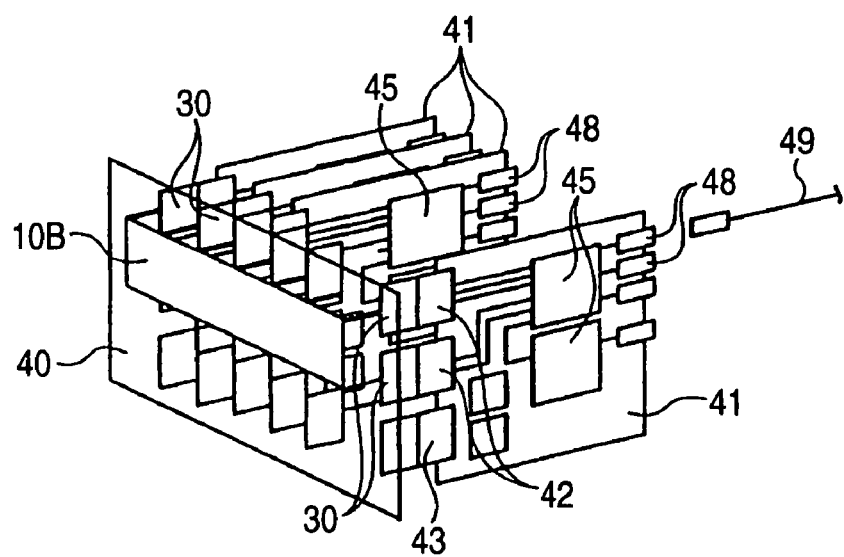
FIG. 3 is a perspective view showing an example of optical and electronic composite wiring using the optical fiber sheet according to a second embodiment.
Figure 4:
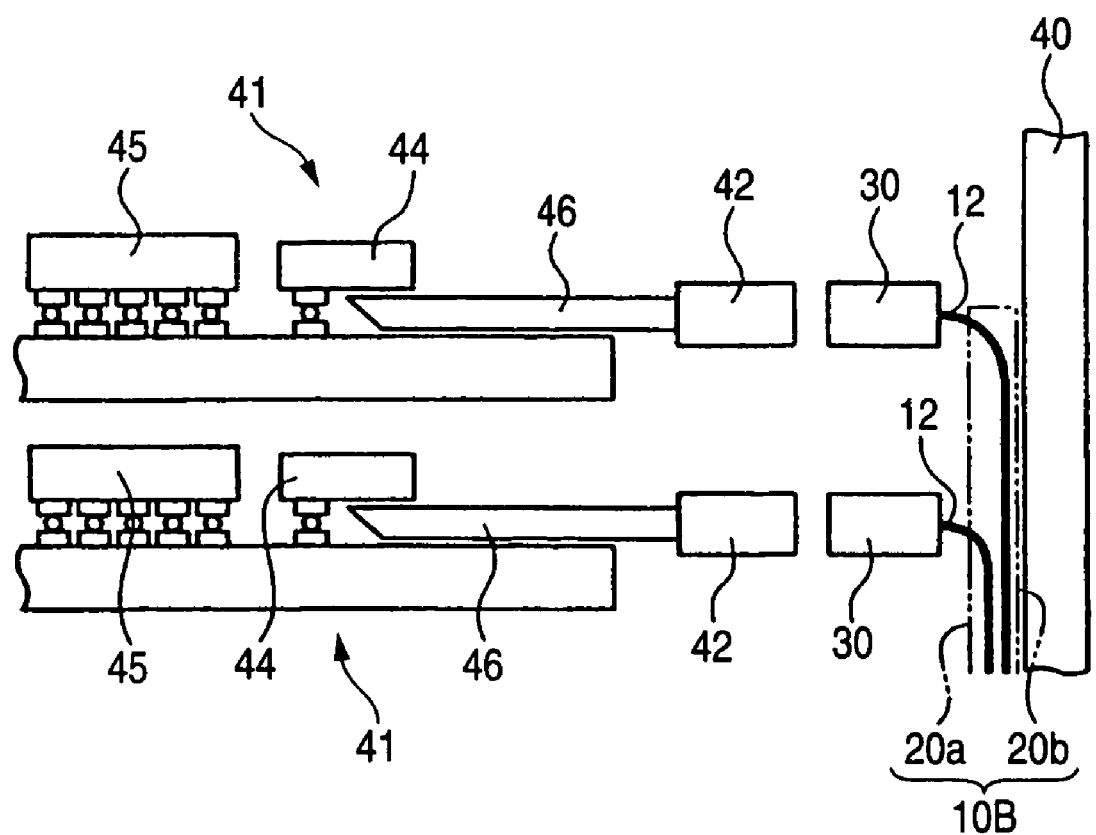
FIG. 4 is an enlarged cross-sectional view showing an optical connector connection area shown in FIG. 3.

FIG. 3 is a perspective view showing an example of optical and electronic composite wiring using the optical fiber sheet according to the second embodiment. FIG. 4 is a cross-sectional view showing an optical connector connection area shown in FIG. 3. Similar reference numbers are given to similar parts used in the first embodiment and the same explanation is not repeated.

As illustrated in FIGS. 3 and 4, an optical fiber sheet 10B is attached onto a board 40 in a state that the extensions 12 extending from the outer peripheral edges 21 of the sheet members 20 are bended at right angles with respect to the sheet members 20. Thus, the extensions 12 project perpendicularly also with respect to a surface of the board 40.

As illustrated in FIG. 3, a plurality of optical boards 41 can be connected with the board 40 through connectors 42 which are connected with the connectors 30 provided on the optical fiber sheet 10B. Electric connectors 43 are equipped between the optical boards 41 and the board 40 so that the optical boards 41 and the board 40 can be electrically connected.

The board 40 having this structure is provided in an optical back plane of an optical transmission device housing so that a plurality of the optical boards 41 can be connected with the housing.

As illustrated in FIG. 4, plane-emission-type semiconductor lasers 44 and LSIs 45 are packaged on the optical boards 41. Optical waveguide passages 46 are connected with the plane-emission-type semiconductor lasers 44, and the connectors 42 connected with the connectors 30 on the optical fiber sheet 10B side are provided on the optical waveguide passages 46. Thus, the plane-emission-type semiconductor lasers 44 emit light in accordance with optical signals sent from the optical fiber sheet 10B. As illustrated in FIG. 3, a plurality of external I/Fs 48 are provided on the optical boards 41 so that external optical fibers 49 can be connected with the optical boards 41 through the I/Fs 48.

As obvious from above explanation, according to the optical fiber sheet in the second embodiment, the connectors 30 provided at the distal ends of the extensions 12 extending from the optical fiber sheet 10B attached to the board 40 are disposed in the direction perpendicular to the board 40. Thus, the optical boards 41 or the like can be easily connected with the connectors 30.

The optical fiber sheet and its manufacturing method according to the invention are not limited to those in the respective embodiments shown and depicted herein, but various modifications, improvements and the like may be appropriately given to those.

For example, according to the optical fiber sheet and its manufacturing method described above, the two sheet members 20, 20 are used and a single layer of the optical fibers 11 is wired between the two sheet members 20, 20, but multiple layers of the optical fibers 11 may be wired by overlapping a greater number of the sheet members 20.

Further, for example, according to the optical fiber sheet and its manufacturing method described above, each of the extensions 12 is composed of the separate optical fibers 11, but the optical fibers 11 in each of the extensions 12 may be ribbonized, for example, by sandwiching the optical fibers 11 with two films and laminating them. In this case, adhesives may be applied on the films in advance, or the films with the optical fibers 11 sandwiched between them may be heated during the lamination. Further, this ribbonization of the optical fibers may be performed before or after the connector 30 is attached to the extension.

Further, for example, according to the optical fiber sheet and its manufacturing method described above, the distal ends 12a of the extensions 12 are inserted into the fiber holes 31 of the connectors 30 with the resin coatings 11b applied to the distal ends 12a and fixed by the adhesive 32, and finally the end faces of the connectors 30 are ground. However, another optical fibers which are previously ground may be provided within the connectors 30 in advance, and then the distal ends 12a of the extensions 20 may be inserted into the connectors 30 and connected to the previously ground another optical fibers by adhesives within the connectors 30.

With this structure, the optical fibers at the extensions 20 can be prevented from being broken at the grinding process after the insertion of the distal ends 12a of the extension 20 into the connectors 30.

According to the optical fiber sheet and its manufacturing method according to the invention described above, connection operation errors can be reduced by attaching the connectors without removing the resin coatings from the optical fibers and thus the necessity of providing excessively long surplus portions can be eliminated. Accordingly, the invention can be employed as an optical fiber sheet having optical fibers whose distal ends extend from outer peripheral edges of sheet members with resin coatings applied to the distal ends, and as a manufacturing method of the optical fiber sheet.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An optical fiber sheet, comprising:
   optical fibers sandwiched between sheet members and fixed thereto, each of the optical fibers having a glass portion comprising a core portion and a cladding portion, an outer circumferential surface of the glass portion being coated with a resin coating, distal ends of the optical fibers extending from outer peripheral edges of the sheet members with the resin coating applied to the distal ends of the optical fibers to produce extensions; and
   connectors having fiber holes for insertion of distal ends of the extensions, wherein:

the distal ends of the extensions inserted into the connectors have the same resin coating applied to the distal ends of the optical fibers that produce the extensions, and the distal ends of the extensions are inserted into the fiber holes of the connectors, respectively, without the resin coating applied to the distal end of the extensions being removed;

wherein the optical fibers are multimode optical fibers, the minimum coating thickness of the multimode optical fibers is 22.5 µm, and the allowable bend radius of the optical fibers wired between the sheet members is 5 mm.

2. An optical fiber sheet according to claim 1, wherein:

the extensions are bended in a direction perpendicular to the plane of the sheet members, and the connectors are attached to the distal ends of the bended extensions so that the optical fiber sheet can be attached on a board in a state that the connectors project from a surface of the board.

3. A method of manufacturing an optical fiber sheet, comprising the steps of:

wiring optical fibers coated with a resin coating on a first sheet member, each of the optical fibers has a glass portion comprising a core portion and a cladding portion, an outer circumferential surface of the glass portion being coated with the resin coating, and forming extensions by extending distal ends of the optical fibers by a predetermined length from an outer peripheral edge of the first sheet member;

overlapping a second sheet member on the first sheet member to combine these sheet members into one piece; and inserting distal ends of the extensions into fiber holes of connectors without removing the resin coating applied to the distal ends of the extensions of the optical fibers;

wherein the optical fibers are multimode optical fibers, the minimum coating thickness of the multimode optical fibers is 22.5 µm, and the allowable bend radius of the optical fibers wired between the sheet members is 5 mm.

4. A method of manufacturing an optical fiber sheet according to claim 3, further comprising a step of:

ribbonizing the optical fibers at each of the extensions.

5. An optical back planes comprising:

a board; and an optical fiber sheet attached on the board, the optical fiber sheet including optical fibers sandwiched between sheet members and fixed thereto, distal ends of the optical fibers extending from outer peripheral edges of the sheet members with a resin coating applied to the distal ends to produce extensions, and connectors having fiber holes for insertion of distal ends of the extensions, the distal ends of the extensions inserted into the connectors have the same resin coating applied to the distal ends of the optical fibers that produce the extensions, wherein the extensions are bended in a direction perpendicular to the plane of the sheet members, and the connectors are attached to the distal ends of the bended extensions so that the connectors can project from a surface of the board;

wherein the optical fibers are multimode optical fibers, the minimum coating thickness of the multimode optical fibers is 22.5 µm, and the allowable bend radius of the optical fibers wired between the sheet members is 5 mm.

* * * * *